(12) United States Patent
Teli et al.

(10) Patent No.: US 8,567,254 B2
(45) Date of Patent: *Oct. 29, 2013

(54) PRESSURE SENSOR ASSEMBLY

(75) Inventors: Basavaraja M. Teli, Karnataka (IN); Ian Bentley, New Ipswich, NH (US); Jim Cook, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/305,469

(22) Filed: Nov. 28, 2011

(65) Prior Publication Data

US 2012/0067132 A1 Mar. 22, 2012

Related U.S. Application Data

(63) Continuation of application No. 12/616,623, filed on Nov. 11, 2009, now Pat. No. 8,082,797.

(51) Int. Cl.
*G01L 15/00* (2006.01)

(52) U.S. Cl.
USPC .............................................. 73/716; 73/736

(58) Field of Classification Search
None
See application file for complete search history.

(56) References Cited

U.S. PATENT DOCUMENTS

| 5,257,547 | A | 11/1993 | Boyer |
| 5,327,785 | A | 7/1994 | Maurer |
| 5,410,916 | A | 5/1995 | Cook |
| 5,438,877 | A | 8/1995 | Vowles |
| 5,644,285 | A | 7/1997 | Maurer |
| 5,691,480 | A | 11/1997 | Cook, Sr. et al. |
| 5,969,591 | A | 10/1999 | Fung |
| 6,023,978 | A | 2/2000 | Dauenhauer et al. |
| 6,143,673 | A | 11/2000 | Jang et al. |
| 6,148,673 | A | 11/2000 | Brown |
| 7,077,008 | B2 | 7/2006 | Pham et al. |
| 7,162,927 | B1 | 1/2007 | Selvan et al. |
| 7,311,006 | B2 | 12/2007 | Yamashita |
| 7,430,918 | B2 | 10/2008 | Selvan et al. |
| 7,591,186 | B1 | 9/2009 | Boyer |
| 7,597,005 | B2 | 10/2009 | McMonigal |
| 7,622,782 | B2 | 11/2009 | Chu et al. |

(Continued)

FOREIGN PATENT DOCUMENTS

WO 2008128015 A1 10/2008

OTHER PUBLICATIONS

Data Instruments, Advanced Silicon Group, "Transducer Product Group", 14 pages, 1997.

(Continued)

*Primary Examiner* — Andre Allen
(74) *Attorney, Agent, or Firm* — Seager Tufte & Wickhem LLC

(57) ABSTRACT

The present disclosure relates to pressure sensors. In one illustrative embodiment, the pressure sensor may include a pressure sensor assembly having pressure ports on opposite sides of the pressure sensor assembly. The pressure sensor may include a protective housing including a first housing member and a second housing member defining a cavity for securely housing the pressure sensor assembly. The protective housing may include a first port coupled to one of the pressure ports of the pressure sensor assembly and a second port coupled to the other pressure port of the pressure sensor assembly. In some cases, the protective housing may include one or more aligning features, one or more positioning features, and a boss, which can include two or more bumps, on each side of the cavity around the pressure ports.

20 Claims, 16 Drawing Sheets

(56) References Cited

U.S. PATENT DOCUMENTS

| | | |
|---|---|---|
| 7,624,632 B1 | 12/2009 | Hoyle et al. |
| 7,908,926 B2 | 3/2011 | Eckhardt |
| 2007/0197922 A1 | 8/2007 | Bradley et al. |
| 2008/0000302 A1 | 1/2008 | Ueno |
| 2009/0199647 A1 | 8/2009 | Hadjiloucas et al. |
| 2009/0288484 A1 | 11/2009 | Selvan et al. |
| 2009/0288492 A1 | 11/2009 | Stewart et al. |
| 2010/0013165 A1 | 1/2010 | Speldrich et al. |
| 2010/0122583 A1 | 5/2010 | Rozgo et al. |
| 2010/0251825 A1 | 10/2010 | Kurtz |
| 2010/0269595 A1 | 10/2010 | Villa et al. |

OTHER PUBLICATIONS

Honeywell, "Commercial Switches and Sensors", Interactive Catalog, 40 pages, Aug. 2002.

Honeywell, "Installation Instructions for the Compensated and Calibrated Pressure Sensors, XCXL, XCX Series", 2 pages, 2003.

Honeywell, "XPC, XPCL, XPX, XPXL Series, Silicon Pressure Sensors, Uncompensated/Compensated and Compensated Calibrated", 6 pages, 2004.

PRESSURE SENSOR ASSEMBLY

This application is a continuation of co-pending U.S. patent application Ser. No. 12/616,623, filed Nov. 11, 2009, and entitled "PRESSURE SENSOR ASSEMBLY", which is incorporated herein by reference.

FIELD

The present disclosure relates generally to pressure sensors, and more particularly, to methods and devices for packing pressure sensors.

BACKGROUND

Pressure sensors are utilized in a wide variety of applications, including, for example, commercial, automotive, aerospace, industrial, and medical applications, to sense and/or monitor a pressure. In many applications, the operational environments in which pressure sensors are required to operate with high accuracy and repeatability can be very demanding. There is a need for new and improved pressure sensors and/or pressure sensor enclosures for operating in various environments and in various applications.

SUMMARY

The following summary is provided to facilitate an understanding of some of the innovative features unique to the present disclosure and is not intended to be a full description. A full appreciation of the disclosure can be gained by taking the entire specification, claims, drawings, and abstract as a whole.

The present disclosure relates generally to pressure sensors, and more particularly, to methods and devices for packaging pressure sensors. In one illustrative embodiment, a pressure sensor may include a pressure sensor assembly, a first housing member, and a second housing member. The pressure sensor assembly may include a differential pressure sensor housing that may have a first pressure port on a first side of the differential pressure sensor housing and a second pressure port on a second opposite side of the differential pressure sensor housing. The pressure sensor assembly may include one or more leads extending out from the differential pressure sensor housing.

The first housing member may define an inner surface, wherein the inner surface of the first housing member may be configured to surround at least part of the differential pressure sensor housing. The first housing member may have a first pressure port that extends from external to the first housing member to the inner surface of the first housing member, wherein the inner surface of the first housing member may surround the at least part of the differential pressure sensor housing. The first pressure port of the first housing member may be in fluid communication with the first pressure port of the differential pressure sensor housing.

The second housing member may define an inner surface, wherein the inner surface of the second housing member may be configured to surround at least part of the differential pressure sensor housing. The second housing member may have a second pressure port that extends from external of the second housing member to the inner surface of the second housing member, wherein the inner surface of the second housing member surrounds the at least part of the differential pressure sensor housing, and the second pressure port of the second housing member may be in fluid communication with the second pressure port of the differential pressure sensor housing. The first housing member and the second housing member may be secured to one another and form a protective housing around the differential pressure sensor housing, with the one or more leads of the pressure sensor assembly accessible from external to the first housing member and the second housing member.

In some cases, the pressure sensor may also include a seal between the first pressure port of the first housing member and the first pressure port of the differential pressure sensor housing. The seal may include an adhesive disposed between the inner surface of the first housing member and the first side of the differential pressure sensor housing. In some cases, the inner surface of the first housing member may include a boss that extends around the first pressure port of the first housing member. In some cases, the boss may include two or more bumps.

In some instances, the first housing member and the second housing member may include one or more aligning features, which when present, may help align the first housing member relative to the second housing member, with the pressure sensor assembly situated therebetween. Also, the first housing member and/or the second housing member may include one or more positioning features for positioning the pressure sensor assembly relative to the first housing member and/or the second housing member, if desired.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DETAILED DESCRIPTION

Figure 1:
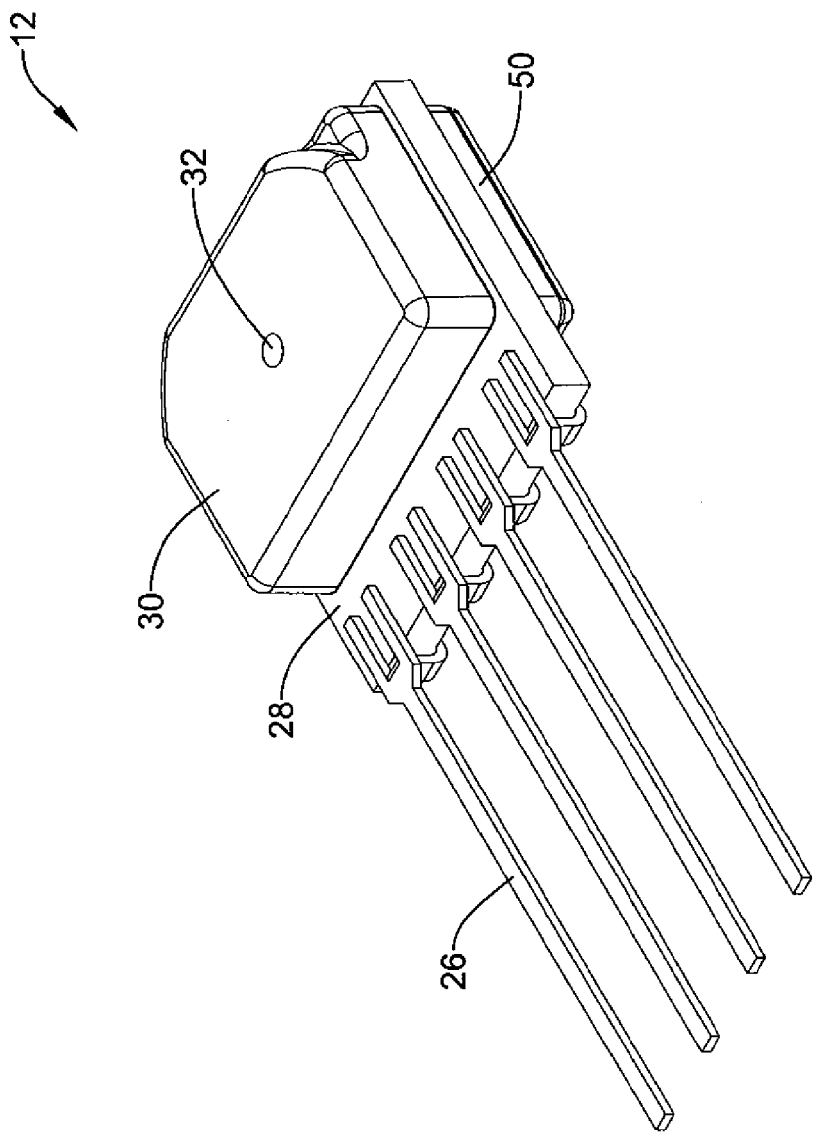
FIG. 1 is a top perspective view of an illustrative pressure sensor assembly.

The following description should be read with reference to the drawings wherein like reference numerals indicate like elements throughout the several views. The detailed description and drawings show several embodiments which are meant to be illustrative of the claimed disclosure.

While, in some embodiments, the Figures may be described with relative terms, such as "upper", "lower", "top", "bottom", "left", "right", as well as other relative terms, it is to be understood that this is merely for illustrative purposes and is not meant to be limiting in any manner.

Figure 2:
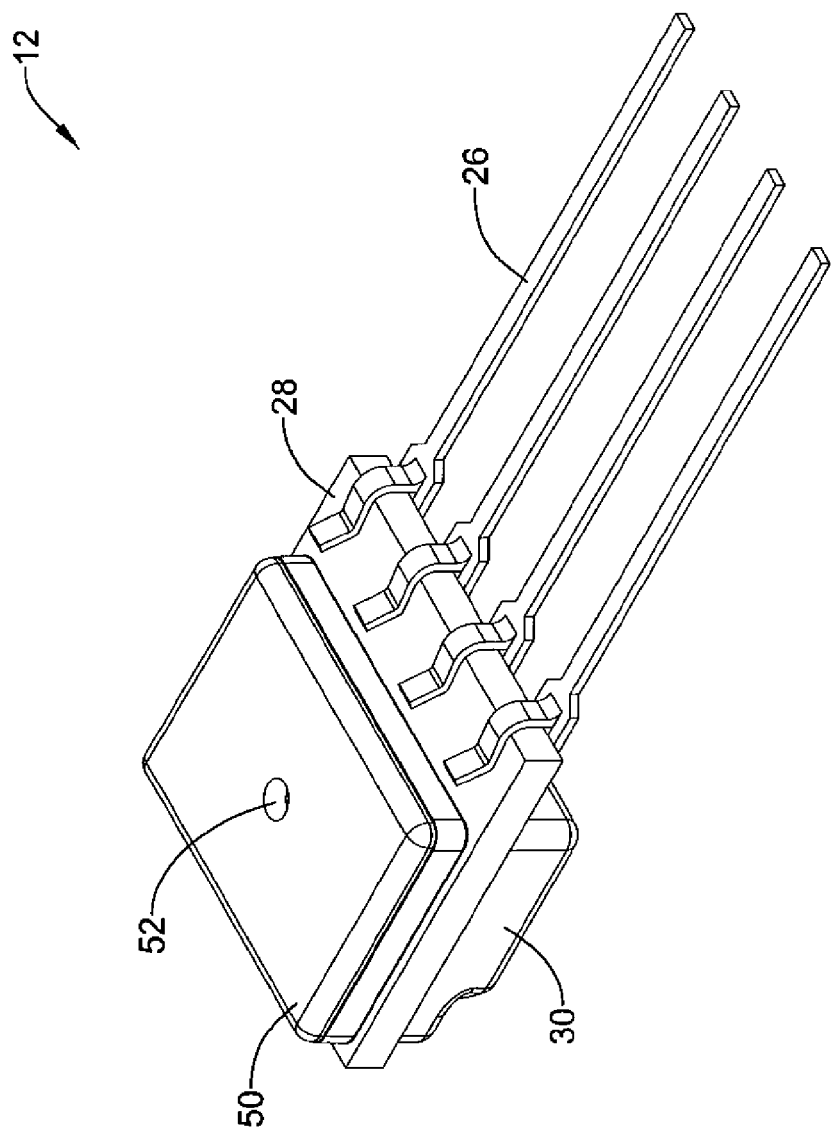
FIG. 2 is a bottom perspective view of the illustrative pressure assembly of FIG. 1.

FIGS. 1 and 2 are top and bottom perspective views, respectively, of an illustrative pressure sensor assembly 12. In the illustrative embodiment, the pressure sensor assembly 12 may include a substrate 28, a pressure sensing element (shown as reference numeral 78 in FIG. 14) mounted onto the substrate for sensing a pressure, signal conditioning circuitry (not shown) mounted onto the substrate for conditioning and/or processing a signal from the pressure sensing element, an outer protective housing including a top protective cover 30 and a bottom protective cover 50, and one or more electrical leads mounted to the substrate 28 and electrically connected to the signal conditioning circuitry.

In the illustrative embodiment, the pressure sensing element is a differential pressure sensing element. However, it is contemplated that other types such as non-differential pressure sensing elements may be used, as desired. For example, the pressure sensing element may be an absolute pressure sensing element or a gauge pressure sensing element. An absolute pressure sensing element may have an internal vacuum reference pressure and a gauge pressure sensing element may reference atmospheric pressure.

In any event, and in one illustrative embodiment, the pressure sensing element may be a piezoresistive sensing element having an electrical resistance that varies according to an applied mechanical stress. In some cases, the piezoresistive sensing element may include a silicon piezoresistive material, however, other non-silicon materials may be used. It is to be understood that the piezoresistive sensing element is only one example of a pressure sensing element that can be used. It is contemplated that any other non-piezoresistive sensing elements may be used, as desired. In some cases, the piezoresistive sensing element is disposed on a diaphragm that is stressed by a pressure of interest.

In some embodiments, the signal conditioning circuitry may receive a signal from the pressure sensing element and condition and/or process the signal for transmission from the pressure sensor assembly 12. In some cases, the signal conditioning circuitry may include an ASIC (Application Specific Integrated Circuit) or other electronics. For example, in some cases, the electronics may include amplification, analog-to-digital conversion, offset compensation circuitry, or other suitable conditioning electronics.

In the illustrative embodiment, the pressure sensing element and the signal conditioning circuitry may be mounted or fabricated on substrate 28. The substrate 28 may include a ceramic material, however, other suitable types of material may be used, as desired.

In the illustrative embodiment, the outer protective housing of the pressure sensor assembly 12 includes a top protective cover 30 and a bottom protective cover 50. As illustrated, the top protective cover 30 is disposed on a top side of the substrate 28 to protect the sensing element and signal conditioning circuitry that may be on the top side of the substrate 28. The bottom protective cover 50 is disposed on a bottom side of the substrate 28 to protect the sensing element and signal conditioning circuitry that may be on the bottom side of the substrate 28. With such a configuration, the top and bottom protective covers 30 and 50 may protect the pressure sensing element and the signal conditioning circuitry. In some cases, the top protective cover 30 and the bottom protective cover 50 may be formed from, for example, plastic. However, it is contemplated that any other suitable material may be used, as desired.

As illustrated in FIG. 1, the top protective cover 30 includes a pressure input port 32 for exposing the pressure sensing element (e.g. pressure sensing diaphragm) to a first pressure. As illustrated in FIG. 2, the bottom protective cover 50 includes a pressure input port 52 for exposing the pressure sensor to a second pressure. The pressure sensing element may be configured to sense a pressure differential across pressure input port 32 and pressure input port 52. A signal corresponding to the sensed pressure difference may be transmitted to the signal conditioning circuitry for conditioning.

In the illustrative embodiment, the pressure sensor assembly 12 may include one or more electrical leads 26 mounted to the substrate 28 and electrically connected to the signal conditioning circuitry for receiving a conditioned signal corresponding to the pressure sensed by the sensing element. In some cases, the one or more electrical leads 26 may include a metal, however, any suitable material may be used, as desired.

Figure 3:
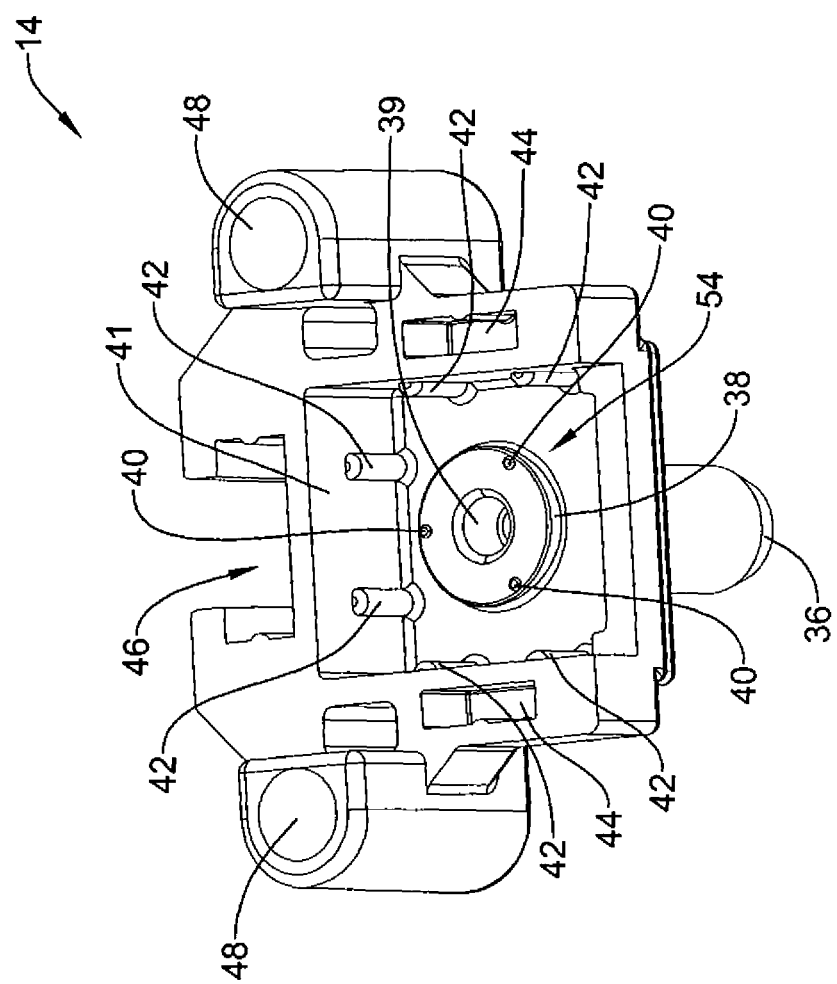
FIG. 3 is a top perspective view of an illustrative embodiment of a housing member for housing the pressure sensor assembly of FIGS. 1 and 2.
Figure 4:
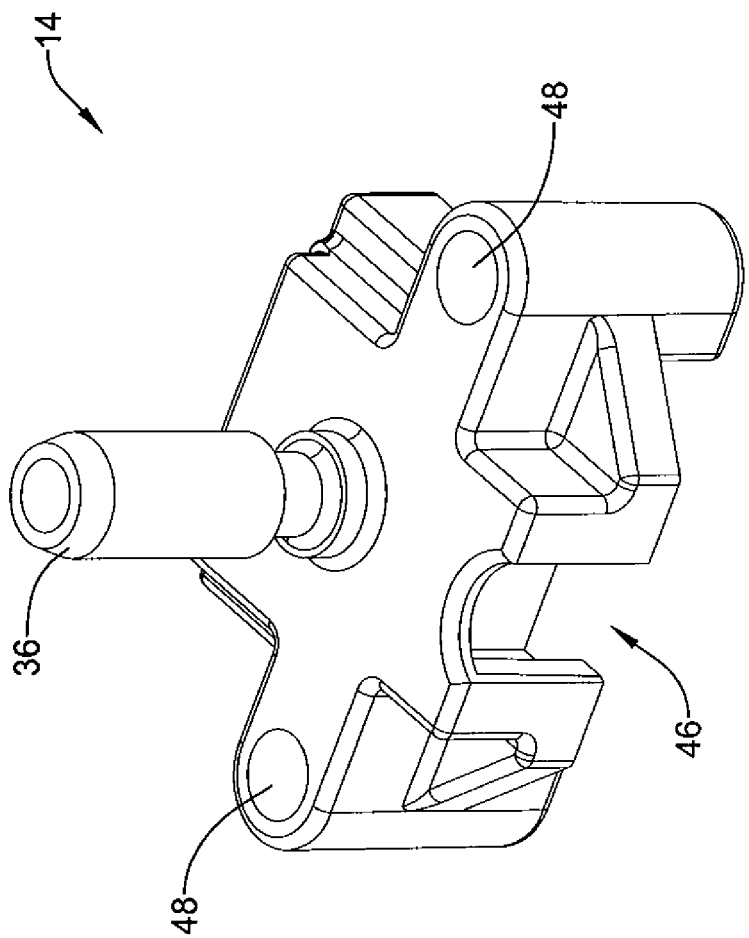
FIG. 4 is a bottom perspective view of the illustrative housing member of FIG. 3.

FIGS. 3 and 4 are top and bottom perspective views, respectively, of an illustrative embodiment of a housing member 14 for housing the pressure sensor assembly 12 shown in FIGS. 1 and 2. In the illustrative embodiment, the housing member 14 may include a cavity 54 defined in part by an inner surface 41 of the housing member 14. As illustrated, the housing member 14 may define a bottom wall and three side walls of the cavity 54. The cavity 54 may be sized and configured to receive at least part of the pressure sensor assembly 12 of FIGS. 1 and 2. In some cases, the cavity 54 may receive the pressure sensor assembly 12 such that the electrical leads 26 extend externally from the cavity 54, as shown in, for example, FIG. 9.

In some embodiments, the inner surface 41 of the housing member 14 may include one or more locating or positioning features 42, an opening 39 extending through the bottom surface of the cavity 54, and a boss 38 disposed around the opening 39. In some cases, the position features 42 can include one or more protrusions, bumps, or ribs on the sides of the inner surface 41 of the cavity 54 configured to align pressure input port 52 of the pressure sensor assembly 12 with opening 39. As illustrated, the inner surface 41 of the cavity 54 includes two positioning features 42 on each of the three sides of the cavity 54. However, it is contemplated that any suitable locating features and/or any suitable number of locating features may be used to align the pressure input port 52 of the pressure sensor assembly 12 with opening 39, as desired.

In some embodiments, boss 38 may be an annular protruding region of a bottom surface of the cavity 54 configured to seal and/or bond the pressure sensor assembly 12 to the housing member 14. In some cases, the boss 38 can include bumps 40 extending into the cavity 54. In some cases, the boss 38 can include one or more bumps 40, two or more bumps 40, three or more bumps 40, or any other number of bumps 40. As shown, the boss 38 include three bumps 40, however, any suitable number of bumps 40 may be used. When the housing member 14 is assembled with the pressure sensor assembly 12, the bumps 40 may provide a predetermined adhesive thickness between the bottom protective cover 50 of the pressure sensor assembly 12 and boss 38. That is, when a flexible or compressible adhesive is employed, and the pressure sensor assembly 12 is pushed against the housing member 14 such that the bumps of the housing member 14 (or housing member 16) are substantially in contact with the pressure sensor assembly, a height of the bumps determines the finished thickness of the adhesive. Thus, by configuring the height of the bumps and the amount of adhesive applied, a seal can be predictably and reliably formed between the housing 14 and the pressure sensor assembly.

In the illustrative embodiment, the housing member 14 may include a pressure port 36 defining a channel (shown as 70 in FIG. 14) extending from the opening 39 in the inner surface 41 of the cavity 54 to external the housing member 14. The pressure port 36 and the channel create a first pressure path to the cavity 54 for the pressure sensor assembly 12. In some cases, the pressure port 36 may be configured to receive a connection to an external pressure source. For example, the pressure port 36 may be configured to have plastic tubing mounted thereon.

Figure 5:
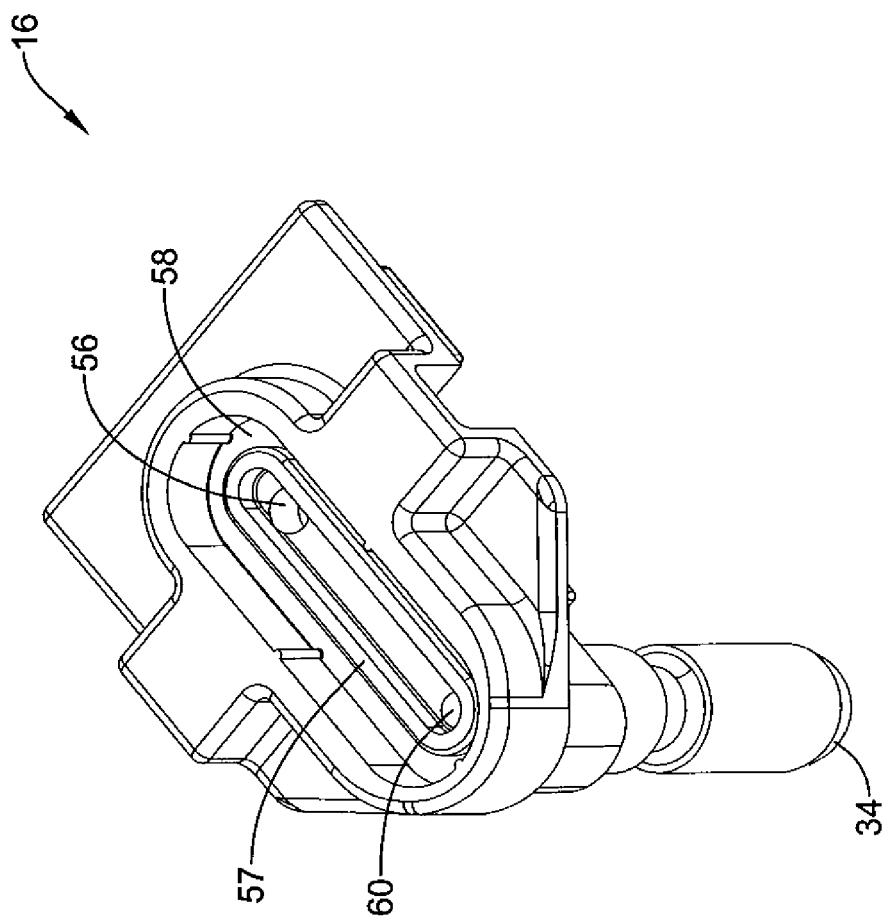
FIG. 5 is a top perspective view of an illustrative embodiment of another housing member for mating with the housing member of FIGS. 3 and 4.
Figure 6:
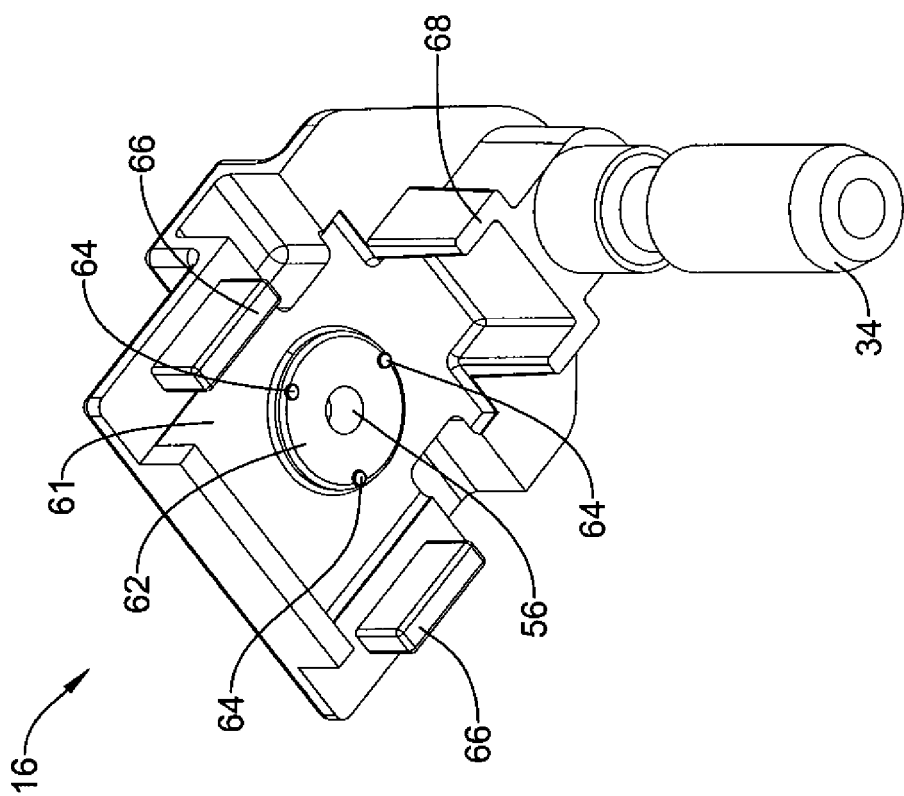
FIG. 6 is a bottom perspective view of the illustrative housing member of FIG. 5.

As illustrated in FIGS. 3 and 4, the housing member 14 may include a number of aligning features for aligning the housing member 14 with another housing member, such as housing member 16 shown in FIGS. 5 and 6. In the illustrative embodiment, the aligning features may include holes 44 and slot 46. As illustrated, holes 44 are generally rectangular openings in the housing member 14 and slot 46 is generally T-shaped. In some cases, holes 44 and slot 46 may include one or more ribs or other protrusions to aid in alignment, but this is not required. It is to be understood that the illustrated aligning features are merely illustrative and are not meant to be limiting in any manner. It is contemplated that any suitable alignment features may be provided, as desired.

In some embodiments, the housing member 14 may also include one or more mounting holes 48 extending through the housing member 14. As illustrated, housing member 14 includes two mounting holes 48, but any suitable number of mounting holes may be used, as desired. The mounting holes 48 may be configured to receive a fastener, such as a screw, bolt, or nail, to mount the housing member 14 to a desired surface to accommodate the particular equipment for which the pressure sensor 10 may be used. It is contemplated that housing member 14 may include additional mounting holes 48 or no mounting holes 48, as desired.

In the illustrative embodiment, the housing member 14 can be molded in a single piece from a plastic or other suitable material according to design considerations. For example, the housing member 14 may be formed by injection molding. However, it is contemplated that housing member 14 may be formed as a composite or made by other suitable methods and materials, as desired.

FIGS. 5 and 6 are top and bottom perspective views of another illustrative housing member 16. In the illustrative embodiment, housing member 16 is configured to mate with housing member 14 and secure the pressure sensor assembly 12 therebetween. As illustrated in FIG. 6, the housing member 16 may include a number of aligning features for aligning the housing member 16 with housing member 14. In the illustrative embodiment, the aligning features may include generally rectangular protrusions 66 configured to be received by holes 44 of housing member 14. In some cases, housing member 16 may include a flange portion 68 that is configured to be received in slot 46 of housing member 14. However, it is to be understood that the illustrated aligning features are merely illustrative and are not meant to be limiting in any manner. It is contemplated that any suitable alignment features may be provided, as desired.

As illustrated in FIG. 6, the illustrative housing member 16 may include an inner surface 61 that, when assembled with housing member 14, defines a top surface of cavity 54. As illustrated, the inner surface 61 of housing member 16, or top surface of cavity 54, may include a boss 62 disposed around opening 56. In some cases, boss 62 may be an annular protruding region configured to seal and/or bond the pressure sensor assembly 12 to the housing member 16. In some cases, the boss 62 can include bumps 64 extending outward from the boss 62 and into cavity 54. In some cases, boss 62 may include one or more bumps 64, two or more bumps 64, three or more bumps 64, or any suitable number of bumps 64, as desired. As shown, the boss 62 includes three bumps 64. When the housing member 16 is assembled with the pressure sensor assembly 12, the bumps 64 may provide a predetermined adhesive thickness between the top protective cover 30 of the pressure sensor assembly 12 and boss 62.

As illustrated in FIG. 5, housing member 16 may include a slot or recess 58 in an outer surface. The slot 58 may include a first opening 56 and a second opening 60. As illustrated, the slot 58 may include a boss 57 providing an oval protrusion around openings 56 and 60. A plug member (shown as 18 in FIG. 7) may be positioned in the slot 58 to define a fluid channel between openings 56 and 60. Although not shown, it is contemplated that boss 57 may include one or more bumps to define a bond thickness with plug 18.

In the illustrative embodiment, the housing member 16 may include a pressure port 34 defining a channel (shown as 72 in FIG. 14) extending from the opening 60 in the slot 58 to external the housing member 16. With plug 18 mounted in the slot 46, the channel defined by the pressure port 34 and the channel defined by slot 58 and plug 18 may create a second pressure channel to the cavity for pressure sensor assembly 12. In some cases, the pressure port 34 may be configured to receive a connection to an external pressure source. For example, the pressure port 34 may be configured to have plastic tubing mounted thereon.

In the illustrative embodiment, the housing member 16 can be molded in a single piece from a plastic or other suitable material according to design considerations. For example, the housing member 16 may be formed by injection molding. However, if plug 18 is considered part of housing member 16, the housing member 16 may be molded as multiple parts and assembled together. In any case, it is contemplated that housing member 16 may be formed as a single piece or a composite, or may be made by other suitable methods and materials, as desired.

Figure 7:
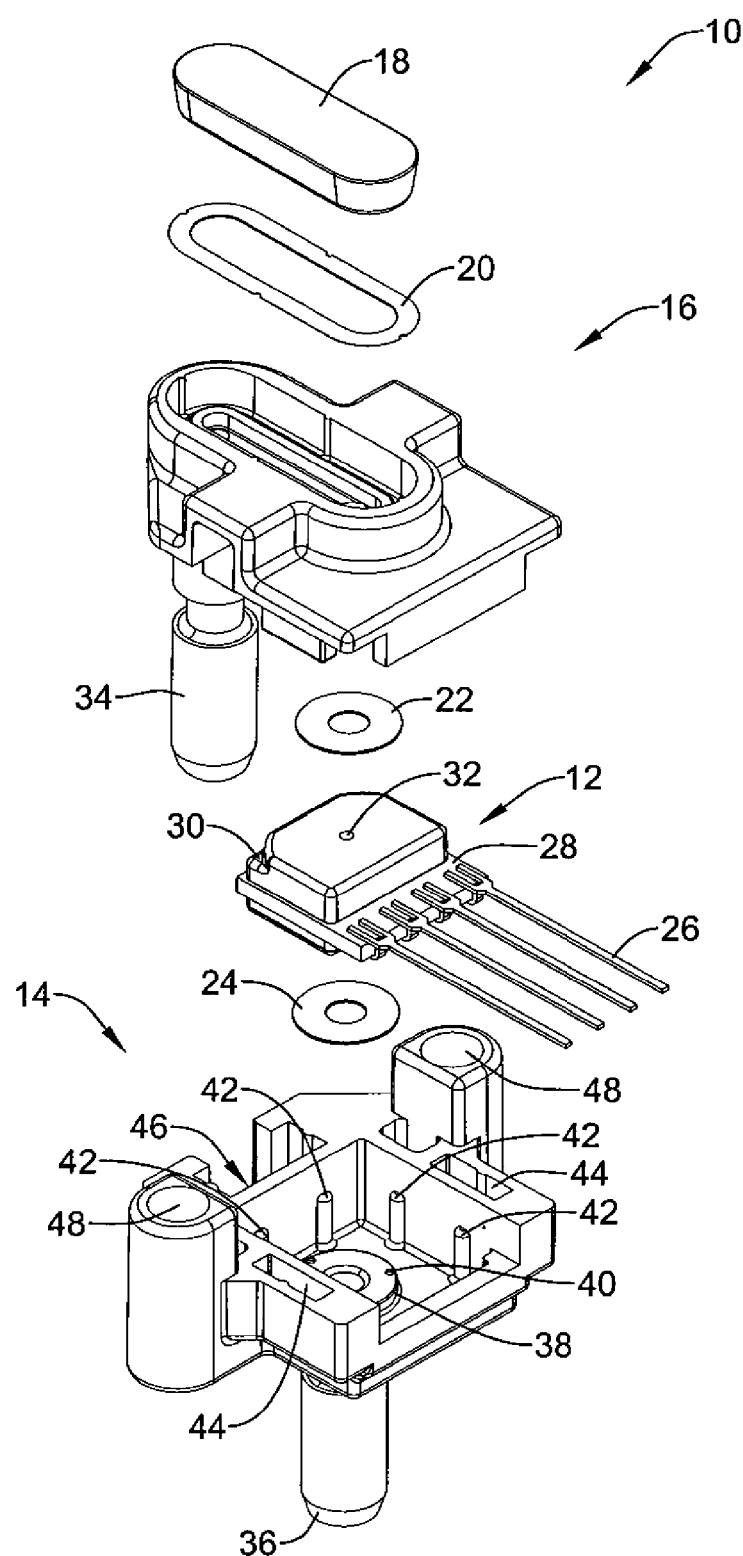
FIG. 7 is an exploded view of an illustrative embodiment of a pressure sensor including the pressure sensor assembly of FIG. 1, the housing member of FIG. 3, and the housing member of FIG. 5.

FIG. 7 is an exploded view of an illustrative embodiment of a pressure sensor 10. In the illustrative embodiment, the pressure sensor 10 includes pressure sensor assembly 12, first housing member 14, and second housing member 16. As illustrated, the pressure sensor assembly 12 may positioned in cavity 54 between housing members 14 and 16 and be sealed with adhesive rings 22 and 24. Adhesive ring 24 may be disposed on boss 38 of housing member 14 and adhesive ring may be disposed on boss 62 of housing member 16 to seal the pressure sensor assembly 12 to housing members 14 and 16. Adhesive rings 24, which may have a bond thickness defined by bumps 40, may fluidly seal pressure input port 52 of the pressure sensor assembly 12 to pressure port 36 for receiving a pressure. Adhesive rings 22, which may have a bond thickness defined by bumps 64, may fluidly seal pressure input port 32 of the pressure sensor assembly 12 to opening 56 of housing member 16. As described previously, opening 56 of housing member 16 may be fluidly sealed to opening 60 and pressure port 34 by plug 18, which may be sealed to boss 57 by adhesive ring 20.

Figure 8:
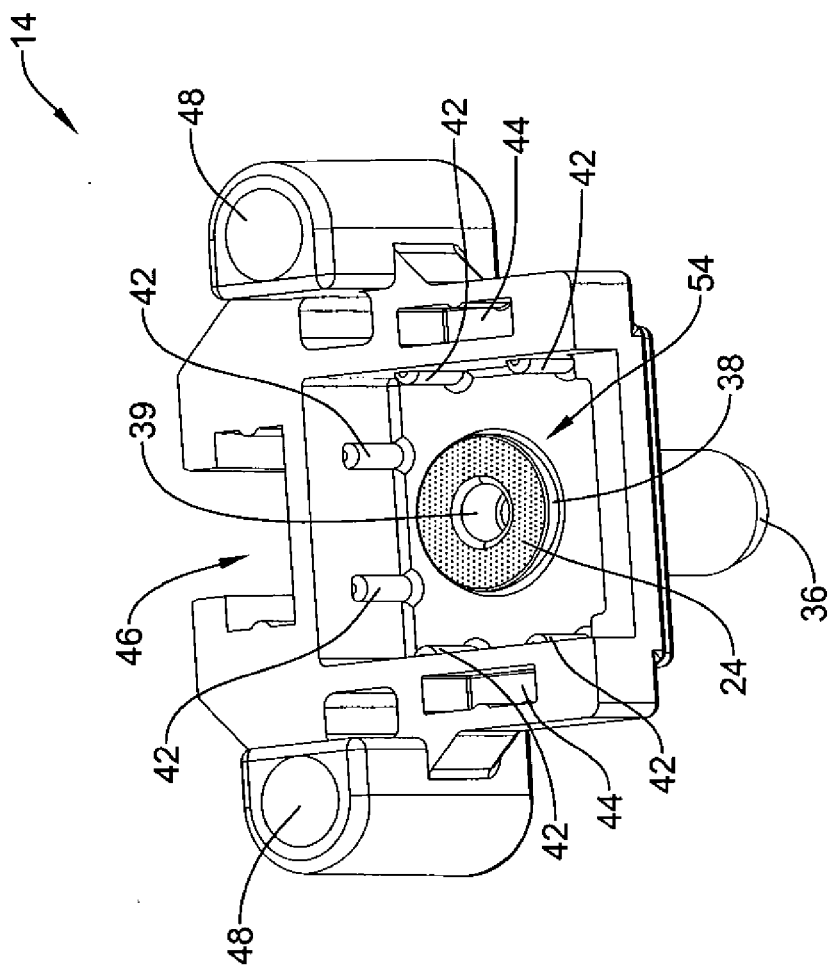
FIGS. 8-13 are perspective views of an illustrative method of assembling the pressure sensor of FIG. 7.

FIG. 8-13 are perspective views of an illustrative method of assembling the pressure sensor 10. As shown in FIG. 8, adhesive ring 24 may be dispensed over the boss 38 of the housing member 14 for attaching pressure sensor assembly 12 to housing member 14. Alternatively, it is contemplated that adhesive ring 24 may be dispensed over pressure sensor assembly 12 around pressure input port 52. In either case, it is contemplated that adhesive may be applied to or dispensed over other portions of the housing member 14 or pressure sensor assembly 12, as desired.

Figure 9:
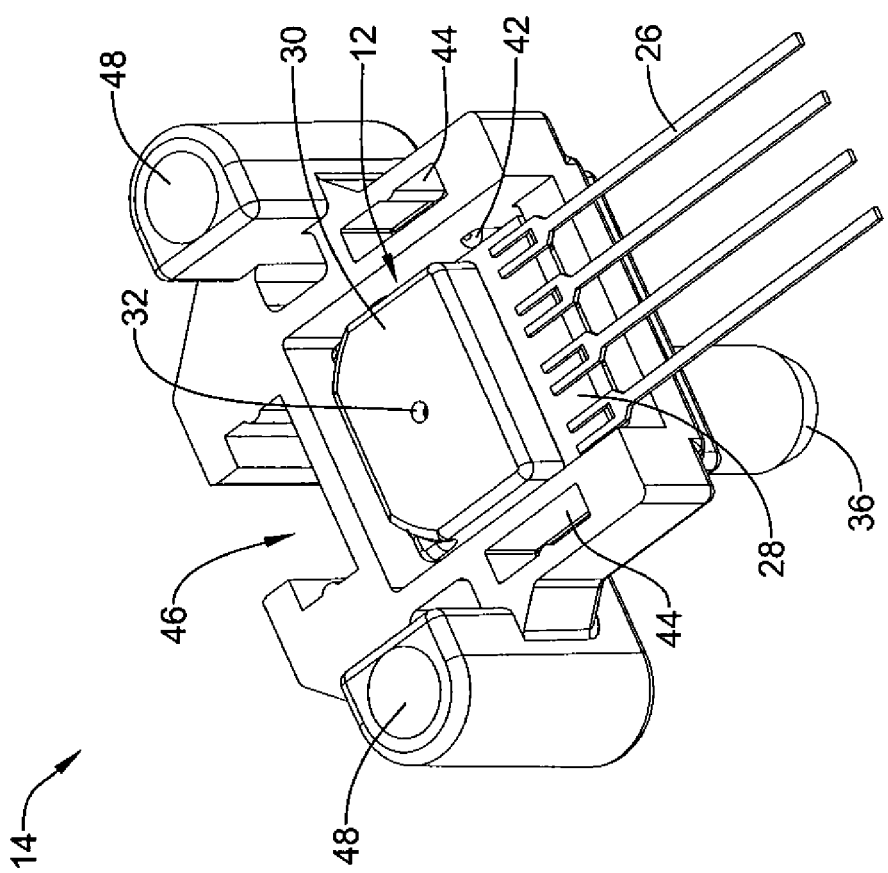

As shown in FIG. 9, the pressure sensor assembly 12 may be assembled to the housing member 14 by positioning the pressure sensor assembly 12 in cavity 54. The adhesive 24 provided on the boss 38 may seal the pressure sensor assembly 12 to the housing member 14. By applying a pressure to the pressure sensor assembly 12, the bumps 40 of the boss 38 may provide a predetermined bond thickness for the bond provided by the adhesive, between the pressure sensor assembly 12 and the housing member 14.

While the pressure sensor assembly 12 is being positioned in the cavity of housing member 14, positioning features 42 may help to align the pressure input port 52 of the pressure sensor assembly 12 with opening 39, which is fluidly connected to the pressure channel defined by pressure port 36.

Figure 10:
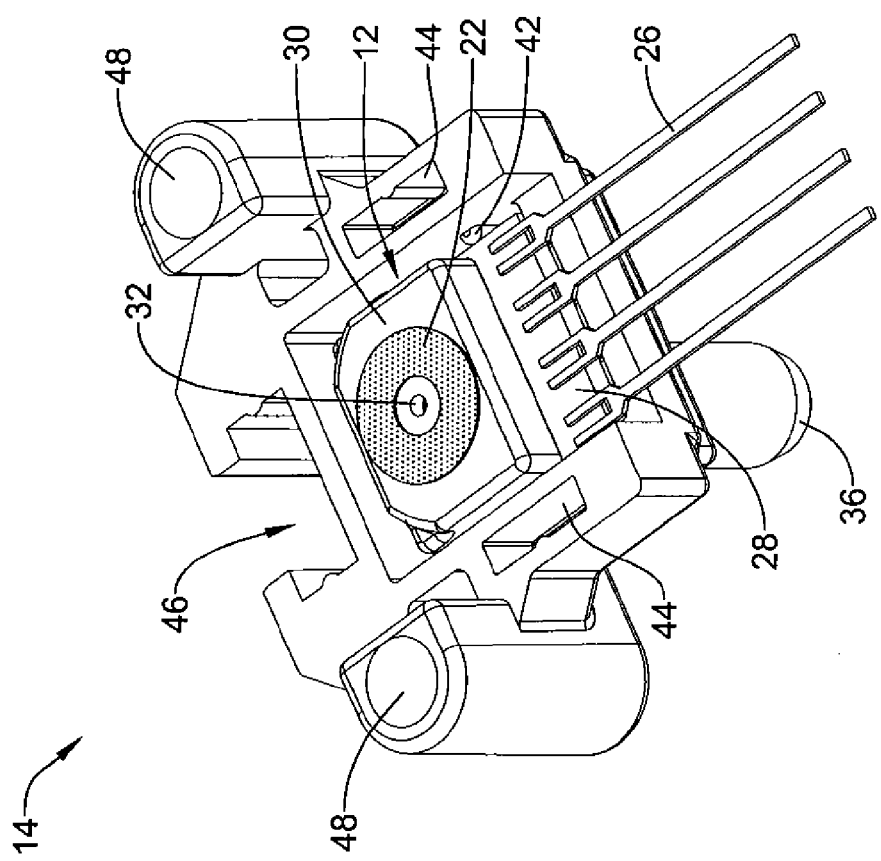

As shown in FIG. 10, adhesive ring 22 may be dispensed over the pressure sensor assembly 12 around pressure input port 32 for attaching pressure sensor assembly 12 to housing member 16. Alternatively, it is contemplated that adhesive ring 22 may be dispensed over boss 62 of housing member 16 for attaching pressure sensor assembly 12 to housing member 16. In either case, it is contemplated that adhesive may be applied to or dispensed over other portions of the housing member 16 or pressure sensor assembly 12, as desired.

Figure 11:
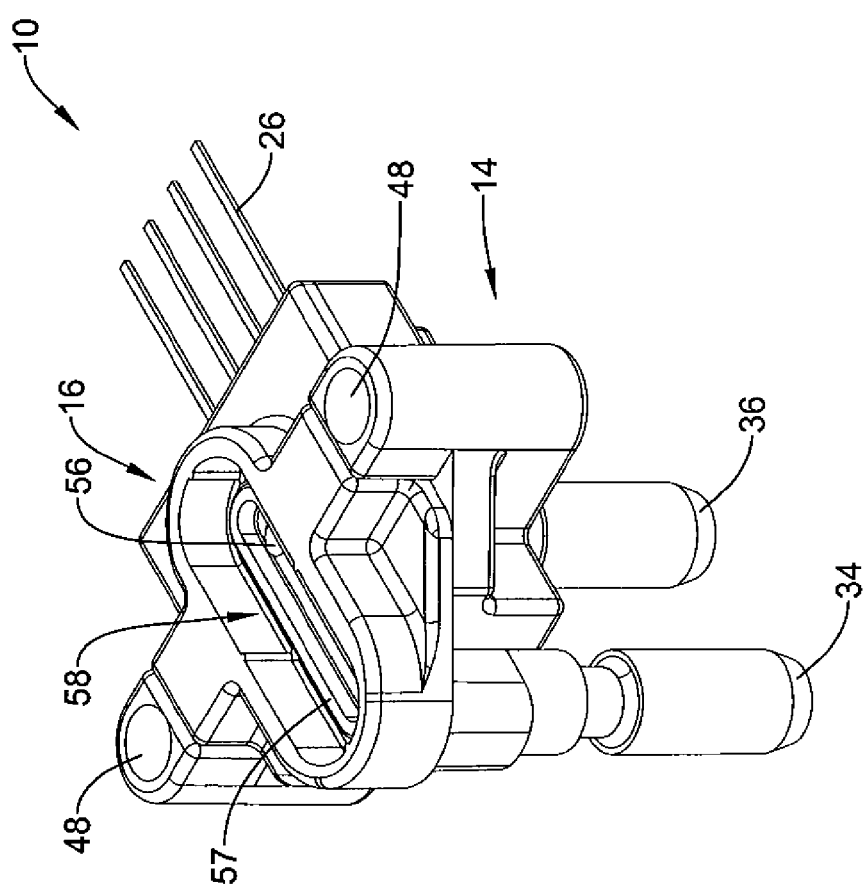

As shown in FIG. 11, housing member 16 may be assembled with housing member 14 and pressure sensor assembly 12. While assembling housing member 16 and housing member 14, the alignment features of housing member 16 may be received by the alignment features of housing member 14 to align housing members 14 and 16. Also, pressure input port 32 of the pressure sensor assembly 12 may be aligned with opening 56 of housing member 16. The adhesive 22 provided between the boss 62 and pressure sensor assembly 12 may seal pressure sensor assembly 12 to housing member 16. By applying a pressure to the housing member 16, the height of the bumps 64 of the boss 62 may provide a predetermined bond thickness for the adhesive bond.

Figure 12:
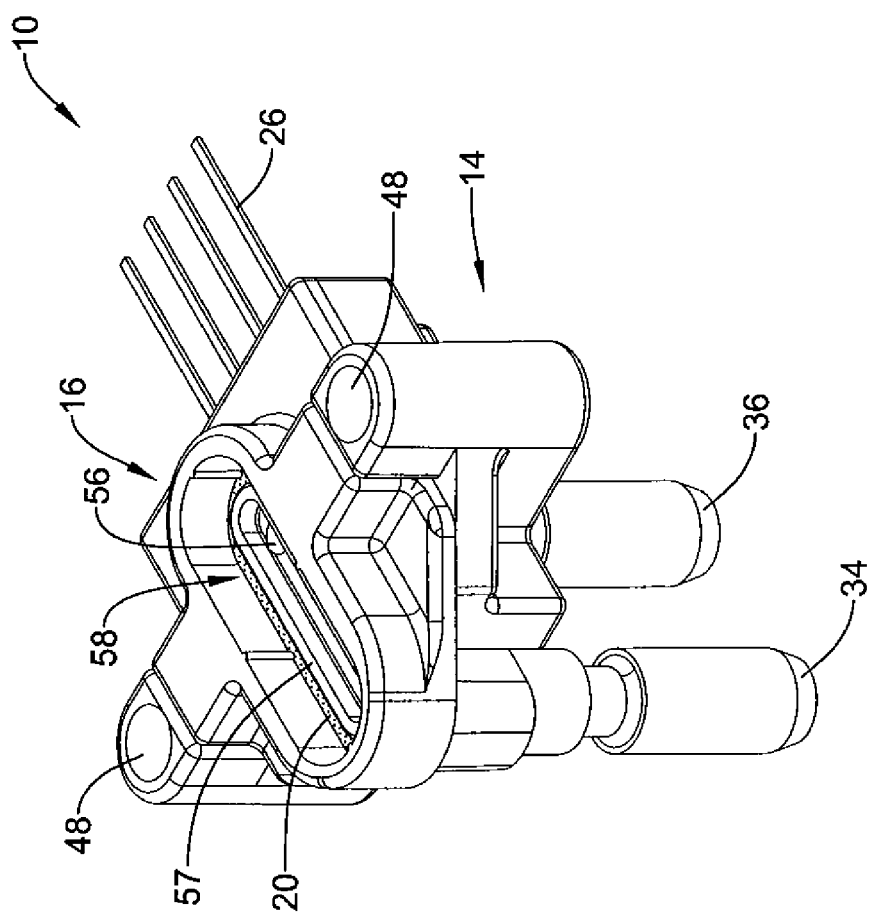

As shown in FIG. 12, adhesive 20 may be may be dispensed over and/or around boss 57 of slot 58 for plug 18 to housing member 16 to define a fluid flow channel between openings 56 and 60. Alternatively, it is contemplated that adhesive 20 may be dispensed over plug 18. In either case, it is contemplated that adhesive may be applied to or dispensed over other portions of the housing member 16 or plug 18, as desired.

Figure 13:
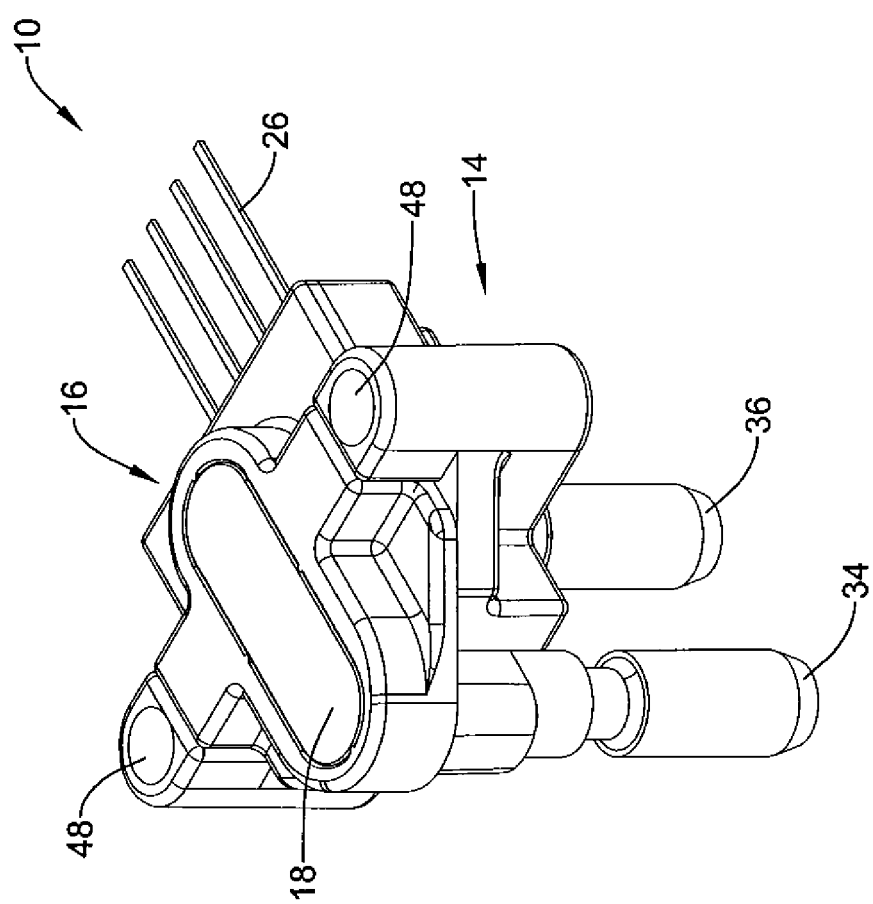

As shown in FIG. 13, the plug 18 may be assembled into the slot 58 of housing member 16 to define the pressure fluid path between openings 56 and 60 of housing member 16. Plug 18 may be secured to slot 58 by adhesive 20 creating a bond between plug 18 and housing member 16.

As shown in FIG. 13, the one or more electrical leads 26 of pressure sensor assembly 12 extend externally from the housing members 14 and 16 and may be accessible from external to the housing member 14 and the second housing member 16.

Further, it is to be understood that the sequence of the foregoing assembly procedure is not meant to be limiting. It is contemplated that the foregoing assembly procedure could be performed in any suitable sequence, as desired.

Figure 14:
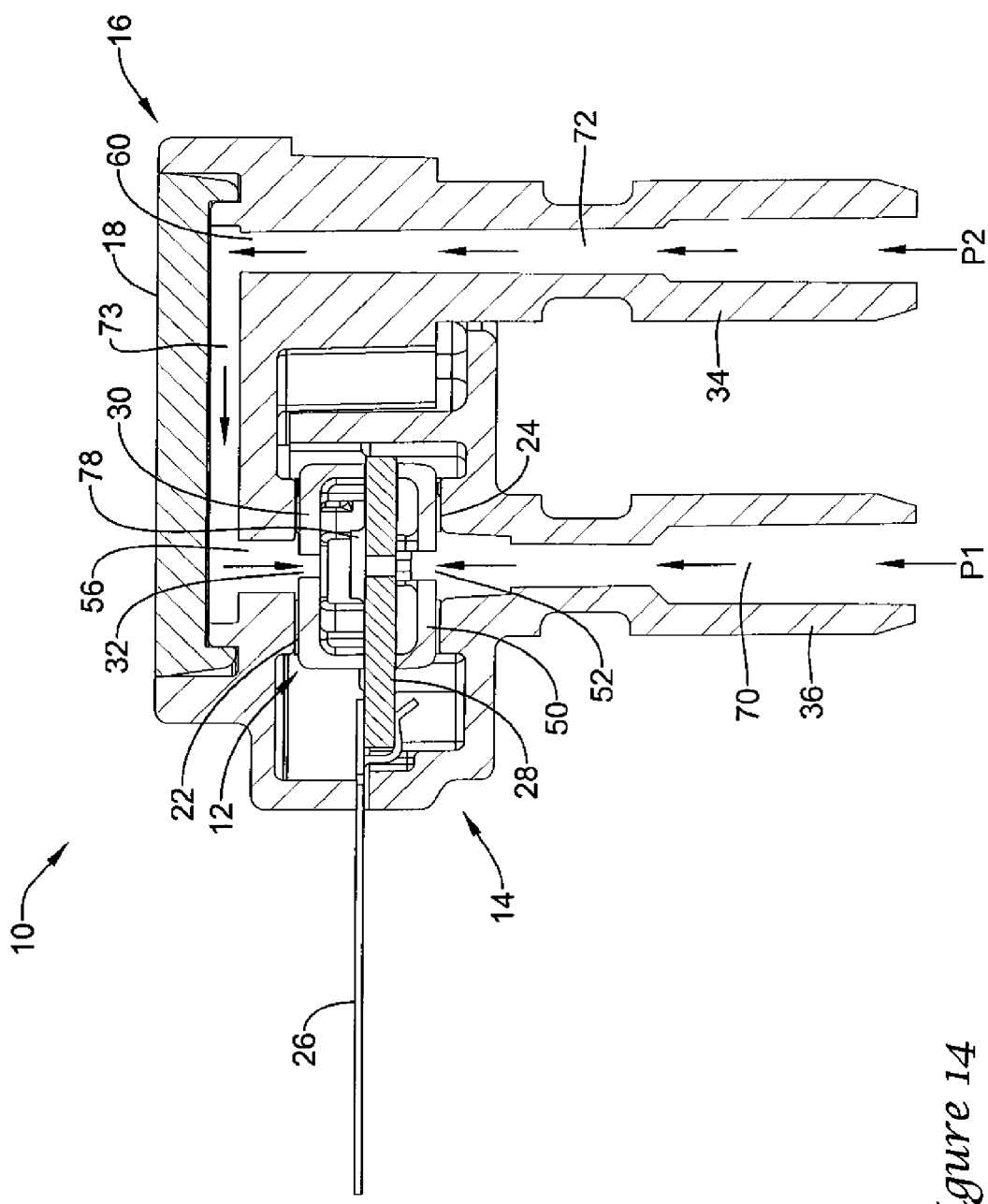
FIG. 14 is a cross-sectional view of the illustrative pressure sensor of FIG. 7.

FIG. 14 is a cross-sectional view of the illustrative pressure sensor 10 shown in FIG. 13. As illustrated, the pressure sensor 10 includes pressure ports 34 and pressure port 36 that are configured to be connected to different pressure systems or atmosphere. In the illustrative embodiment, pressure ports 34 and 36 may extend to the same side of the pressure sensor 10, but this is not required.

A first pressure P1 may flow through channel 70 defined by pressure port 36, enter pressure sensing assembly 12, and contact a first side of a piezoresistive diaphragm 78. A second pressure P2 may flow through channel 72 defined by pressure port 34, through a channel 73 extending between openings 56 and 60 defined by plug 18, and enter pressure sensor assembly 12, and contact a second side of the piezoresistive diaphragm 78. A pressure difference between pressure P1 and pressure P2 can cause a deflection of piezoresistive diaphragm 78 causing the resistance of the piezoresistive diaphragm 78 to change. Applying a current through the piezoresistive diaphragm 78 may provide a signal corresponding to the pressure difference between pressures P1 and P2. This signal may be conditioned by conditioning circuitry (not shown, but which may be provided on the substrate 28) and output via electrical leads 26.

Figure 15:
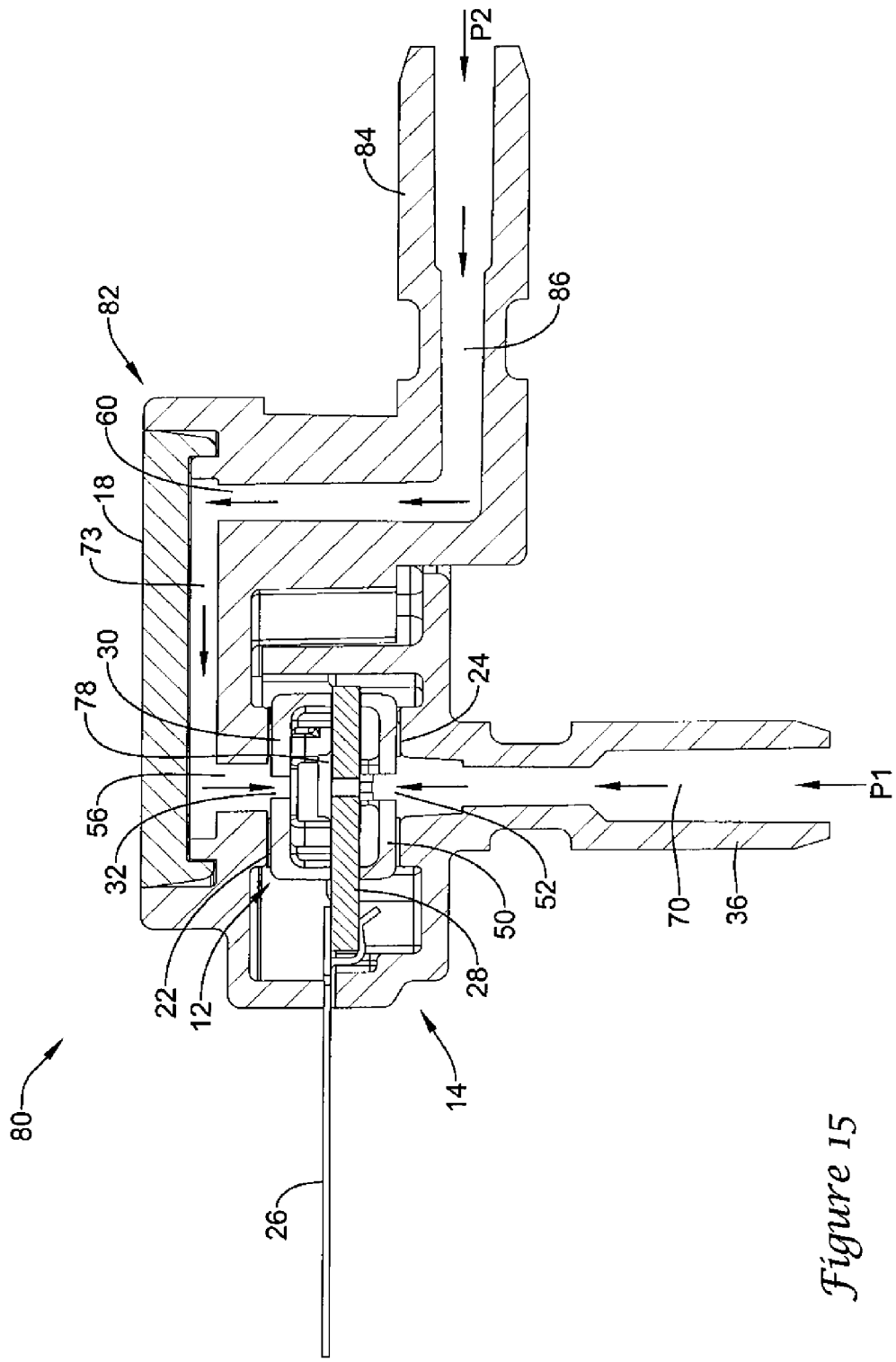
FIG. 15 is a cross-sectional view of an illustrative embodiment of another pressure sensor.

FIG. 15 is a cross-sectional view of another illustrative pressure sensor 80. Similar to pressure sensor 10, pressure sensor 80 may include pressure sensor assembly 12 and housing member 14. Pressure sensor 80 may include a housing member 82 in place of housing member 16. Housing member 82 is similar to housing member 16 except that pressure port 84, which defines pressure channel 86, extends in a different direction than pressure port 36. As illustrated, pressure port 84 extends to the relative right side of the pressure sensor 80 and pressure port 36 extends to the relative bottom side. It is contemplated that pressure port 84 could extend to the relative back side, front side, or left side, as desired. Further, it is contemplated that pressure port 36 may extend in different directions, as desired.

Figure 16:
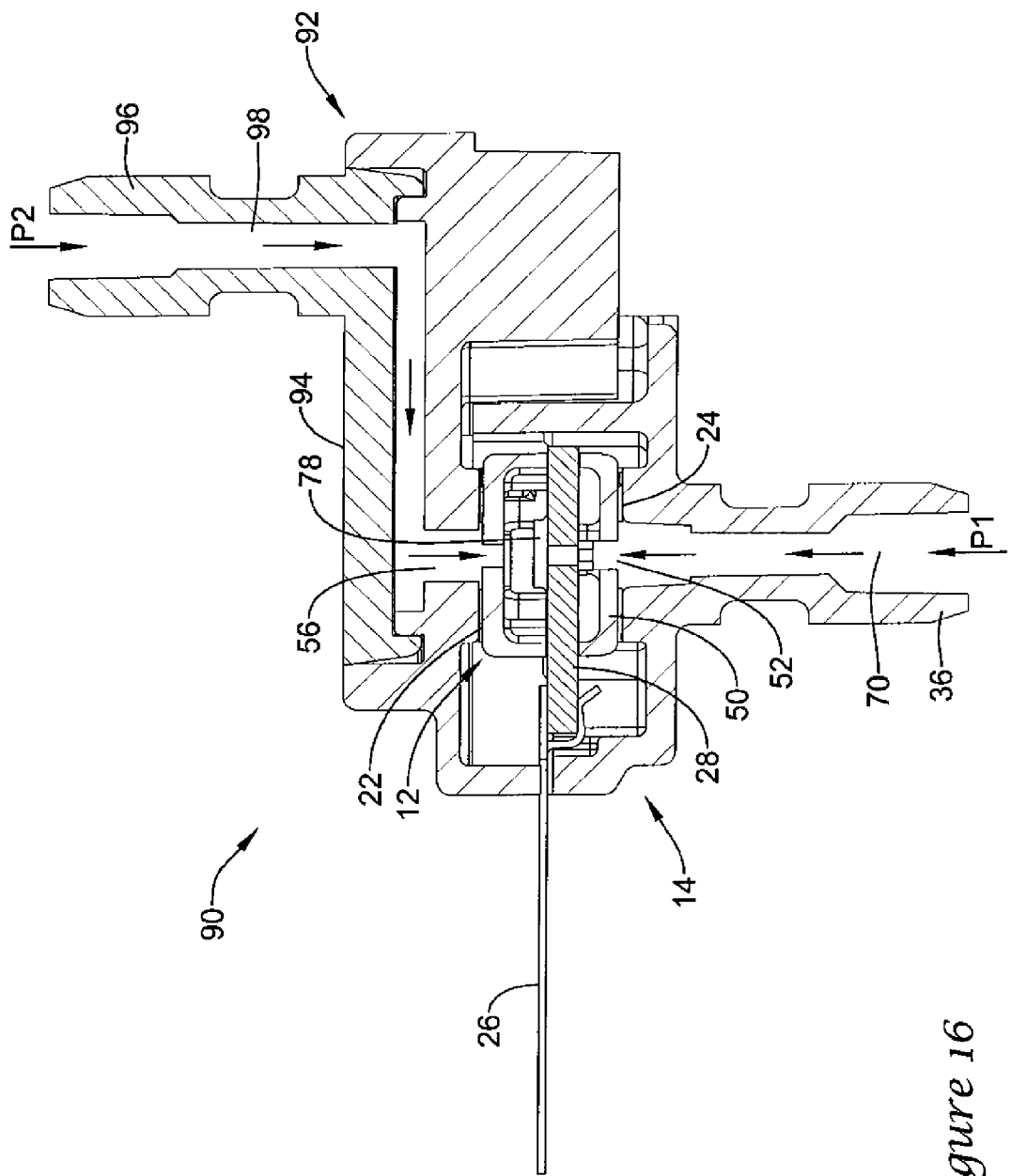
FIG. 16 is a cross-sectional view of an illustrative embodiment of yet another pressure sensor.

FIG. 16 is a cross-sectional view of another illustrative pressure sensor 90. Similar to pressure sensor 10, pressure sensor 90 may include pressure sensor assembly 12 and housing member 14. Pressure sensor 90 may include a housing member 92 in place of housing member 16. Housing member 92 is similar to housing member 16 except that pressure port 96, which defines pressure channel 98, extends in an opposite direction than pressure port 36. Further, in the illustrative embodiment, plug 94 may be modified to accommodate the pressure channel 98, as needed.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The scope is, of course, defined in the language in which the appended claims are expressed.

What is claimed is:

1. A pressure sensor, comprising:
   a pressure sensor assembly including:
      a pressure sensor housing having a first pressure port on a first side of the pressure sensor housing and a second pressure port on a second opposite side of the pressure sensor housing;
      one or more leads extending out from the pressure sensor housing;
   a housing having a first pressure port that is in fluid communication with the first pressure port of the pressure sensor housing, and a second pressure port in fluid communication with the second pressure port of the pressure sensor housing;

the housing forming a protective housing around at least part of the pressure sensor housing, with the one or more leads of the pressure sensor assembly accessible from external to the housing.

2. The pressure sensor of claim 1, wherein the first pressure port of the housing exits the housing in a first direction relative to the pressure sensor assembly, and the second pressure port of the housing exits the housing in a direction parallel to the first direction.

3. The pressure sensor of claim 2, wherein both the first pressure port and the second pressure port of the housing exit the housing and face away from the first side of the pressure sensor housing.

4. The pressure sensor of claim 1, wherein the housing includes a mounting side and one or more mounting holes, the mounting side of the housing is adjacent the second side of the pressure sensor housing, wherein the mounting side is configured to be mounted adjacent a substrate when one or more fasteners are secured relative to the substrate through the one or more mounting holes of the housing.

5. The pressure sensor of claim 4, wherein both the first pressure port and the second pressure port of the housing exit the housing and face away from the mounting side of the housing.

6. The pressure sensor of claim 1, further includes a first seal between the first pressure port of the housing and the first pressure port of the pressure sensor housing, and a second seal between the second pressure port of the housing and the second pressure port of the pressure sensor housing.

7. The pressure sensor of claim 6, wherein the first seal and the second seal each include an adhesive.

8. The pressure sensor of claim 1, wherein the housing further includes a first housing member and a second housing member that are secured together about the pressure sensor assembly.

9. The pressure sensor of claim 1, wherein the housing includes one or more positioning features for positioning the pressure sensor assembly relative to the housing.

10. A pressure sensor, comprising:
a pressure sensor assembly having:
   a pressure sensor diaphragm extending substantially along a diaphragm plane;
   a protective cover including one or more pressure input ports in fluid communication with the pressure sensitive diaphragm;
   one or more leads extending out from the protective cover;
a housing including a first pressure port that defines a first fluid path from external to the housing to a first one of the one or more pressure input ports of the protective cover, the housing also including a second pressure port; and
wherein both the first pressure port and the second pressure port exit the housing in a common direction that is substantially perpendicular to the diaphragm plane of the pressure sensor diaphragm.

11. The pressure sensor of claim 10, wherein the housing includes a mounting side and one or more mounting holes, the mounting side of the housing is positioned adjacent a first side of the pressure sensor diaphragm, wherein the mounting side is configured to be mounted adjacent to a substrate when one or more fasteners are secured relative to the substrate through the one or more mounting holes of the housing.

12. The pressure sensor of claim 11, wherein both the first pressure port and the second pressure port of the housing exit the housing and face away from the mounting side of the housing.

13. The pressure sensor of claim 10, further comprising a seal between the first pressure port of the housing and the first one of the one or more pressure input port of the protective cover.

14. The pressure sensor of claim 13, wherein the seal includes an adhesive.

15. The pressure sensor of claim 10, wherein the housing includes a first housing member and a second housing member that are secured together.

16. A pressure sensor, comprising:
a pressure sensor;
a housing for housing the pressure sensor;
one or more leads extending out from the housing;
the housing have a mounting side, and one or more mounting features for mounting the housing such that the mounting side of the housing is adjacent a desired mounting surface;
the housing having a first pressure port and a second pressure port; and
wherein both the first pressure port and the second pressure port exit the housing in a common direction that is substantially perpendicular to the desired mounting surface when the housing is mounted to the desired mounting surface.

17. The pressure sensor of claim 16, wherein the first pressure port and the second pressure port are each configured to receive a tube that extends towards the pressure sensor from a direction that is substantially perpendicular to the desired mounting surface when the housing is mounted to the desired mounting surface.

18. The pressure sensor of claim 17, wherein the one or more leads extend out from the housing in a direction that is substantially parallel to the desired mounting surface when the housing is mounted to the desired mounting surface.

19. The pressure sensor of claim 16, wherein at least one of the one or more mounting features includes a bore that extends through the housing along an axis that is substantially perpendicular to the desired mounting surface when the housing is mounted to the desired mounting surface.

20. The pressure sensor of claim 16, wherein the mounting side of the housing is substantially flat.

* * * * *